(12) United States Patent
Battle et al.

(10) Patent No.: US 7,673,045 B1
(45) Date of Patent: Mar. 2, 2010

(54) MULTIPLE SITE AUTOMATED LOGOUT

(75) Inventors: Ryan W. Battle, Tampa, FL (US); Christopher E. Mitchell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 09/594,332

(22) Filed: Jun. 15, 2000

(51) Int. Cl.
*G06F 15/173* (2006.01)

(52) U.S. Cl. .................. 709/225; 709/219; 709/223; 709/228

(58) Field of Classification Search ............ 709/225
See application file for complete search history.

(56) References Cited

U.S. PATENT DOCUMENTS

| | | | | |
|---|---|---|---|---|
| 5,241,594 A | * | 8/1993 | Kung | 713/151 |
| 5,774,551 A | * | 6/1998 | Wu et al. | 713/155 |
| 5,774,670 A | * | 6/1998 | Montulli | 709/227 |
| 6,026,379 A | * | 2/2000 | Haller et al. | 705/34 |
| 6,100,918 A | * | 8/2000 | Lu | 348/14.08 |
| 6,115,040 A | * | 9/2000 | Bladow et al. | 715/741 |
| 6,161,139 A | * | 12/2000 | Win et al. | 709/225 |
| 6,185,567 B1 | * | 2/2001 | Ratnaraj et al. | 709/203 |
| 6,199,113 B1 | * | 3/2001 | Alegre et al. | 709/229 |
| 6,226,752 B1 | * | 5/2001 | Gupta et al. | 713/201 |
| 6,237,009 B1 | * | 5/2001 | Waldo et al. | 707/206 |
| 6,237,024 B1 | * | 5/2001 | Wollrath et al. | 709/203 |
| 6,243,716 B1 | * | 6/2001 | Waldo et al. | 707/202 |
| 6,434,619 B1 | * | 8/2002 | Lim et al. | 709/229 |
| 6,453,353 B1 | * | 9/2002 | Win et al. | 709/229 |
| 6,490,624 B1 | * | 12/2002 | Sampson et al. | 709/227 |
| 6,549,612 B2 | * | 4/2003 | Gifford et al. | 379/67.1 |
| 6,584,505 B1 | * | 6/2003 | Howard et al. | 709/225 |
| 6,678,731 B1 | * | 1/2004 | Howard et al. | 709/225 |
| 6,851,060 B1 | * | 2/2005 | Shrader | 726/10 |

OTHER PUBLICATIONS

"Single Sign-On Deployment Guide", Netscape Communications Corporation, http://develper.netscape.com/docs/manuals/security/sso/contents.htm, 1997.*

* cited by examiner

*Primary Examiner*—Vivek Srivastava
*Assistant Examiner*—Jeffrey R Swearingen
(74) *Attorney, Agent, or Firm*—Lee & Hayes, PLLC

(57) ABSTRACT

A logout feature of a service that facilitates login to multiple domain websites maintains a list of the sites that a user logs on to during a session and completely logs the user out of all the sites they visited during the session. A data structure in the form of a cookie named "Visited Sites" is used by a login server to maintain a list of all sites that a user logs on to during a session. When the user selects a logout link anywhere on the network, they are directed to a logout page on the login server. The login server retires all login domain cookies first, and displays a page that explains to the user that they are about to be logged out of each domain. The logout page generates image tags for each of the sites listed in the visited-sites cookie. The image tag provides a URL hosted at each site that expires any Passport cookies that are present at the site.

32 Claims, 4 Drawing Sheets

MULTIPLE SITE AUTOMATED LOGOUT

FIELD

This invention relates generally to the field of computers, and in particular to automatically logging out of multiple sites on computers.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright® 2000, Microsoft Corporation, All Rights Reserved.

BACKGROUND

The recent growth in popularity of the Internet has significantly increased the number of Internet users and the number of Internet sites (also referred to as "web sites"). Web sites may provide various types of information to users, offer products or services for sale, and provide games and other forms of entertainment. Many web sites require users to "register" by providing information about themselves before the web server grants access to the site. This registration information may include the user's name, account number, address, telephone number, email address, computer platform, age, gender, or hobbies. The registration information collected by the web site may be necessary to complete transactions (such as commercial or financial transactions). Additionally, information can be collected which allows the web site operator to learn about the visitors to the site to better target its future marketing activities or adjust the information provided on the web site. The collected information may also be used to allow the web site to contact the user directly (e.g., via email) in the future to announce, for example, special promotions, new products, or new features of the web site.

When registering with a web site for the first time, the web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medial records.

If a user visits several different web sites, each web site may require entry of similar registration information about the user, such as the user's name, mailing address, and email address. This repeated entry of identical data is tedious when visiting multiple web sites in a short period of time. Many web sites require the user to register before accessing any information provided on the web site. Thus, the user must enter the requested registration information before they can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID.

After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character). Thus, Bob Smith must maintain a list of web sites, login IDs, and associated passwords for all sites that he visits regularly.

A few services provide a login type of service to make signing into accounts at multiple sites more convenient. Some services provide a key ring, which is essentially a set of images or icons (keys) which when selected provide ID and passwords to a site associated with the key. Each key may correspond to a different site. Another service provides a link to each desired site, which when selected logs a user into the site, and also contains further background information which may be required by a site. While such services make signing into sites easy, it is more difficult to easily sign out of the sites without visiting each site. In addition, the information required by the sites may be incorporated into data files referred to as cookies, which may or may not be deleted on logging out.

There is a need to be able to log out of multiple accounts, and not have other users of the same computer to get into the same accounts. Furthermore, with kiosks and other public devices that are used to access the web to check email, stocks and order from retail outlets, privacy is a great concern. There also is a need for some form of assurance that the user is logged out of each site. A user can manually delete sensitive information, but there is a danger of deleting personalization files. If such files are deleted, they must be entered again the next time the account is entered.

SUMMARY

A logout feature of a service that facilitates login to multiple domain websites maintains a list of the sites that a user logs on to during a session and completely logs the user out of all the sites they visited during the session.

A cookie named "Visited Sites" is used by a login server to maintain a list of all sites that a user logs on to during a session. When the user selects a logout link anywhere on the network, they are directed to a logout page on the login server. The login server retires all login domain cookies first, and displays a page that explains to the user that they are about to be logged out of each domain. The logout page generates image tags for each of the sites listed in the visited-sites cookie. The image tag provides a URL hosted at each site that expires cookies that are present in the user's cookie cache by setting their value to nothing, and their expiration date to a past date.

When a request to logout is received, the Visited Sites cookie is checked, and if present, it is read. All local cookies are then expired, and indicated as such on a user interface. In order to avoid redirecting the user to each domain, the logout page provides an individual image source for each site the user signed into. This enables the login server to log the user out of each domain by clearing selected cookies stored by the domains. It also clears the cookies from the user's browser and then indicates on the logout page if the logout was successful for each domain. Finally, the domain from which the user selected to logout specifies the URL to which the user is redirected.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes a simple representation of a computer system and the operation of multiple computer systems on a network which implement different aspect of the current invention. This is followed by a description of the invention and how it is implemented.

Hardware and Operating Environment

Figure 1:
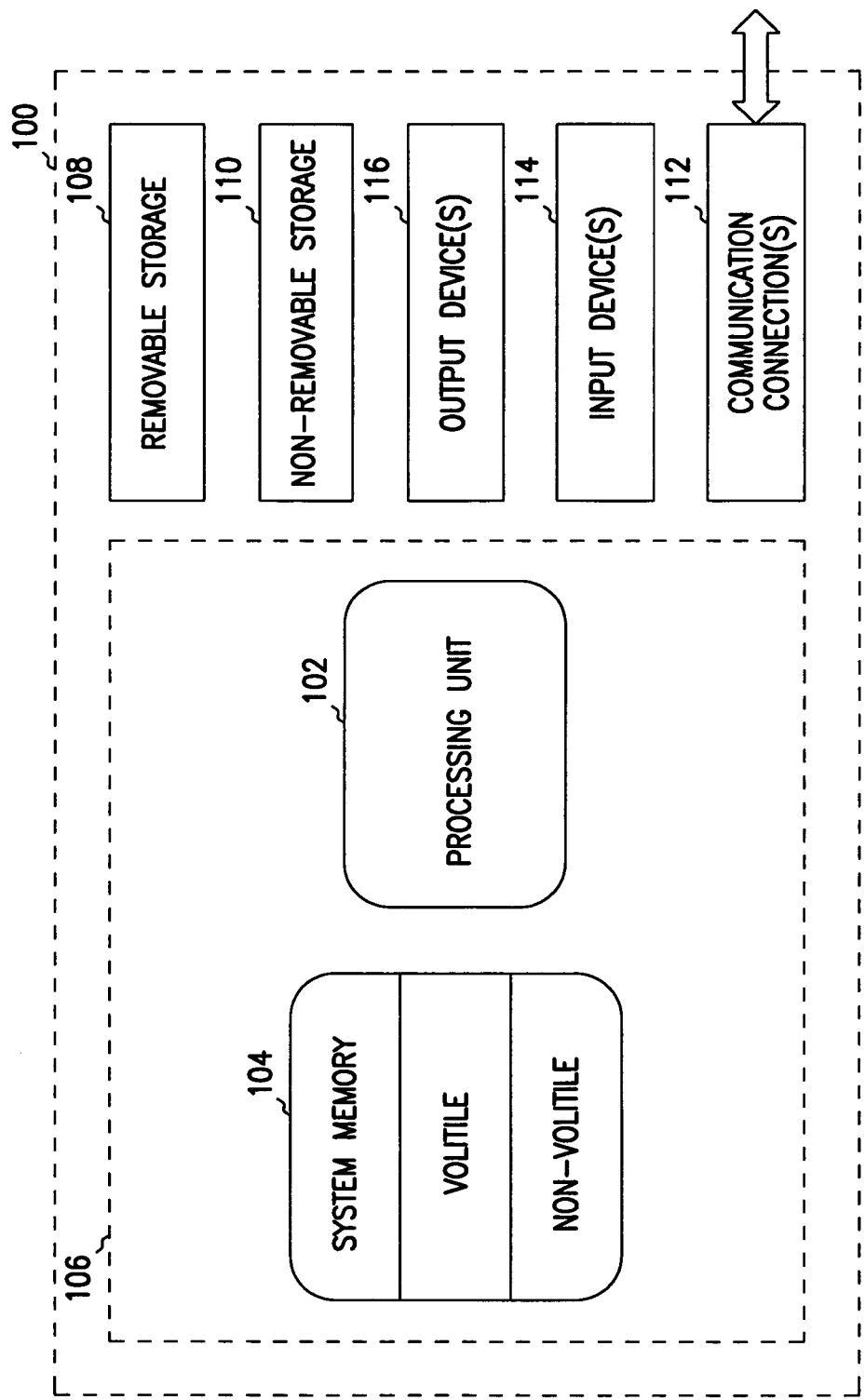
FIG. 1 is a block diagram showing pertinent components of a computer in accordance with the invention.

An exemplary system for implementing the invention includes a computing device, such as computing device 100 in FIG. 1. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by broken line 106.

Device 100 may also include additional features/functionality. For example, device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method of technology for storage of information such as computer readable instructions, data structures, program modules or other data. Memory 104, removable storage 108 and non-removable storage 110 are all examples of computer storage media. Computer storage media includes, but is not limited to RAM, ROM, EEPROM, flash memory or other memory technology, CD-ROM, digital versatile disks (DVD) or other optical storage, magnetic based storage or any other medium which can be used to store desired information and which can be accessed by device 100. Any such computer storage media may be part of device 100.

Device 100 may also contain communications connection(s) 112 that allow the device to communicate with other devices. Communications connection(s) 112 is an example of communication media. Communications media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct-wired connection, and wireless media such as acoustic, RF, infrared and other wireless media. The term computer readable media as used herein includes both storage media and communications media.

Device 100 may also have input device(s) 114 such as keyboard, mouse, pen, voice input device, touch input device, etc. Output device(s) 116 such as display, speakers, printers, etc may also be included. All these devices are well known in the art.

This invention may be described in the context of computer-executable instructions, such as program modules, executed by one or more computer or other devices such as device 110. Generally, program modules include routines, programs, objects, components, data structures, etc. that perform particular tasks or implement particular abstract data types. Typically the functionality of the program modules may be combined or distributed as desired in various embodiments.

Figure 2:
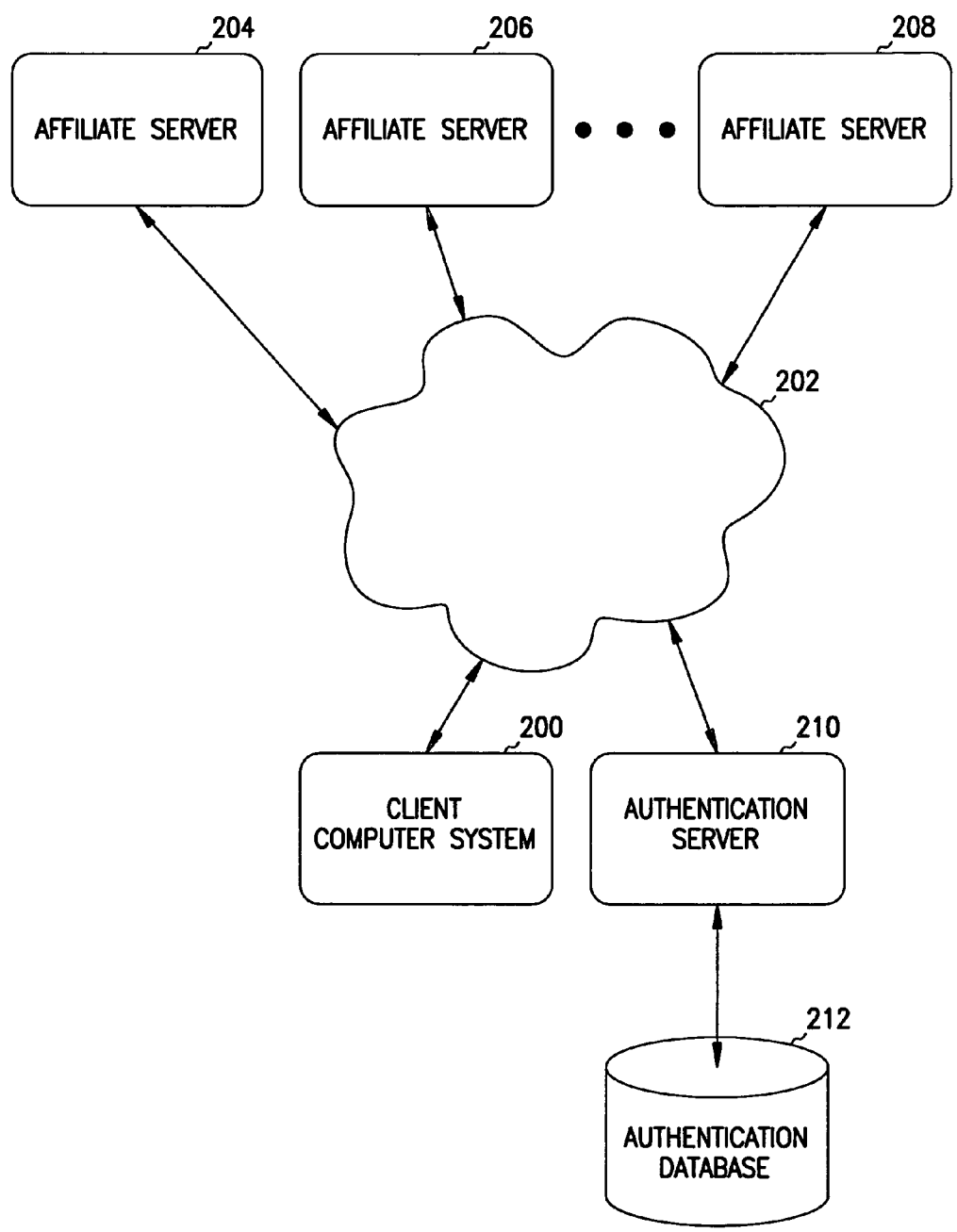
FIG. 2 illustrates an exemplary network environment in which the present invention is utilized.

FIG. 2 is a block diagram illustrating an exemplary network environment in which the present invention is utilized. A client computer system 200 is coupled to a network 202. In this example, network 202 is the Internet (or the World-Wide Web). However, the teachings of the present invention can be applied to any data communication network that implements a stateless protocol similar to hypertext transfer protocol, http. Multiple affiliate servers 204, 206, and 208 are coupled to network 202, thereby allowing client computer system 200 to access web servers 204, 206, and 208 via the network. Affiliate servers 204, 206, and 208 are also referred to as "web servers", "network servers" and "sites" hosting content such as text and images for access by other computers on the network 202. An authentication server 210 is also coupled to network 202, facilitating communication between the authentication server and client computer system 200 and authentication servers 204, 206, and 208. Although referred to as an "authentication server", authentication server 210 is also a web server capable of interacting with web browsers and other web servers. In this example, data is communicated between the authentication server 210, client computer system 200, and web servers using http, a protocol commonly used on the Internet to exchange information. An http specification is published by the Internet Engineering Task Force.

An authentication database 212 is coupled to authentication server 210. The authentication database 212 contains information necessary to authenticate users and also identifies which elements of user profile information should be provided to a particular affiliate server when the user accesses the affiliate server. Although the authentication database 212 is shown separately from the authentication server 210, in other embodiments of the invention, the authentication database is contained within the authentication server.

An authentication process authenticates a user of client computer 200 seeking access to an affiliate server 204, 206, or 208. The authentication server 210 authenticates the user of client computer 200 by requesting authenticating information, such as the user's login ID and password. If the user is successfully authenticated, then authentication server 210 generates an encrypted authentication ticket and communicates the ticket to the appropriate affiliate server. The authentication ticket indicates that the user is authenticated. Each affiliate server requires a key in order to decrypt the ticket and allow access by the user.

The authentication ticket contains two time stamps. The first time stamp indicates the last time that the user's login ID and password were physically typed by the user. The second time stamp indicates the last time that the user's login information was refreshed by the authentication server. This "refresh" of the user's login information can be performed "silently" or by manual entry of the login information (i.e., login ID and password) by the user. The refreshing of the user's login information is performed by the authentication server. Once completed, a new authentication ticket is issued to the affiliate server indicating the new time stamp values.

The term "affiliate server" is defined herein as a web server that has "registered" or established a relationship or affiliation with the authentication server 210. Each affiliate server 204, 206, and 208 includes a code sequence that allows the affiliate server to communicate with the authentication server 210 when a user (who is also registered with the authentication server) requests access to the affiliate server.

Prior to executing the authentication process, both the user of client computer system 200 and the operator of affiliate server 204 "register" with the authentication server 210. This registration is a one-time process which provides necessary information to the authentication server. The user of client computer system 200 registers by providing information such as the user's email address, password information, and various other information about the user or the client computer system if desired. As part of the user registration process, the user is assigned (or selects) a login ID, which is a common login ID used to access any affiliate server. The login ID may also be referred to herein as a "user name" or "login name". Additionally, the user selects a password associated with the login ID which is used for authentication purposes.

After registering and logging into the authentication server, the user can visit any affiliate server (i.e., affiliate servers that are also registered with the same authentication server) without requiring any additional authentication and without re-entering user information that is already contained in the associated user profile.

The operator of affiliate server 204 registers with the authentication server 210 by providing information about the affiliate server (e.g., server name and internet address). Additionally, the affiliate server provides information regarding its authentication requirements. The authentication requirements can be specified as the maximum time allowed since the last login and entry of authentication information by the user as well as the maximum time allowed since the last "refresh" of the authentication information by the user. Refreshing the authentication information refers to the process of having the user re-enter the password to be certain that the appropriate user is still operating the client computer system. This periodic refreshing of authentication information is useful if the user leaves their computer system without logging out of the authentication server, thereby allowing another individual to access affiliate servers using the login ID of the previous user. If a user requests access to the affiliate server after the maximum time allowed, then the user is re-authenticated (i.e., refreshed) by the authentication server by issuing a new authentication ticket either silently or with required reentry of password as described above. Thus, although there is a central authentication server, each individual affiliate server can establish its own authentication requirements which are enforced by the authentication server. After registering with the authentication server, the affiliate server can use the authentication server to authenticate any user that has also registered with the authentication server.

When first logging into an affiliated server web page, the user is redirected to the authentication server for entry of ID and password. If the user-entered information is correct (i.e., matches the information stored in the authentication database) then the authentication server sets appropriate cookies in the client computer system and redirects the user's browser to the affiliate server. A "cookie" is a piece of data provided to a web browser by a web server. The data (i.e., cookie) is sent back to the web server by the web browser during subsequent accesses to the web server. One cookie contains information regarding the date and time that the user was authenticated by the authentication server. Another cookie contains information regarding the user profile. The authentication server also updates (or creates) a cookie that contains a list of all sites (or web servers) visited by the user since the last logout from the authentication server. This cookie is referred to as a visited sites cookie. The visited sites cookie is updated by adding the current affiliate server to the list of sites visited. The list may consist of a set of site IDs which were assigned at registration.

Due to security features implemented in current web browsers, and in compliance with the http specification, cookies written to the client computer system by the authentication server cannot be read by any affiliate server. Similarly, cookies written to the client computer system by a particular affiliate server cannot be read by any other affiliate server. The cookies written by an affiliate server are encrypted using a key that is unique to the affiliate server, thereby preventing other affiliate servers from reading the data stored in the cookies.

The authentication server also communicates the user profile information to the affiliate server through the client computer system. In a particular embodiment of the invention, the user of the client computer system can specify during the registration process what types of profile information should be provided to various types of web servers. For example, a user may specify that all commerce-related web servers should receive the user's email mail address, but restrict the mailing address from all other types of web sites.

After receiving the authentication ticket and the user's profile information, the affiliate server may generate a personalized web page for the user and communicates the web page to the user's browser. Additionally, the affiliate server copies one or more cookies to the client computer system which include information indicating that the user of the client computer system has been authenticated and indicating the period of time during which the authentication is valid. Each time the user enters a new web page request on the same affiliate server, the data in the cookie is sent to the affiliate server along with the page request. Thus, the affiliate server will not repeatedly check the authentication of a user during each subsequent page request. However, if a particular period of time has passed (referred to as a timeout period) since the last authentication process by the authentication server, then the affiliate server may request a re-authorization of the user.

It is difficult for a user to individually remove each cookie when logging out of an affiliate server, or when logging out of all affiliate servers in the visited sites cookie. Since one server cannot access the cookies provided by another server, each affiliate server individually logs out each user.

Figure 3:
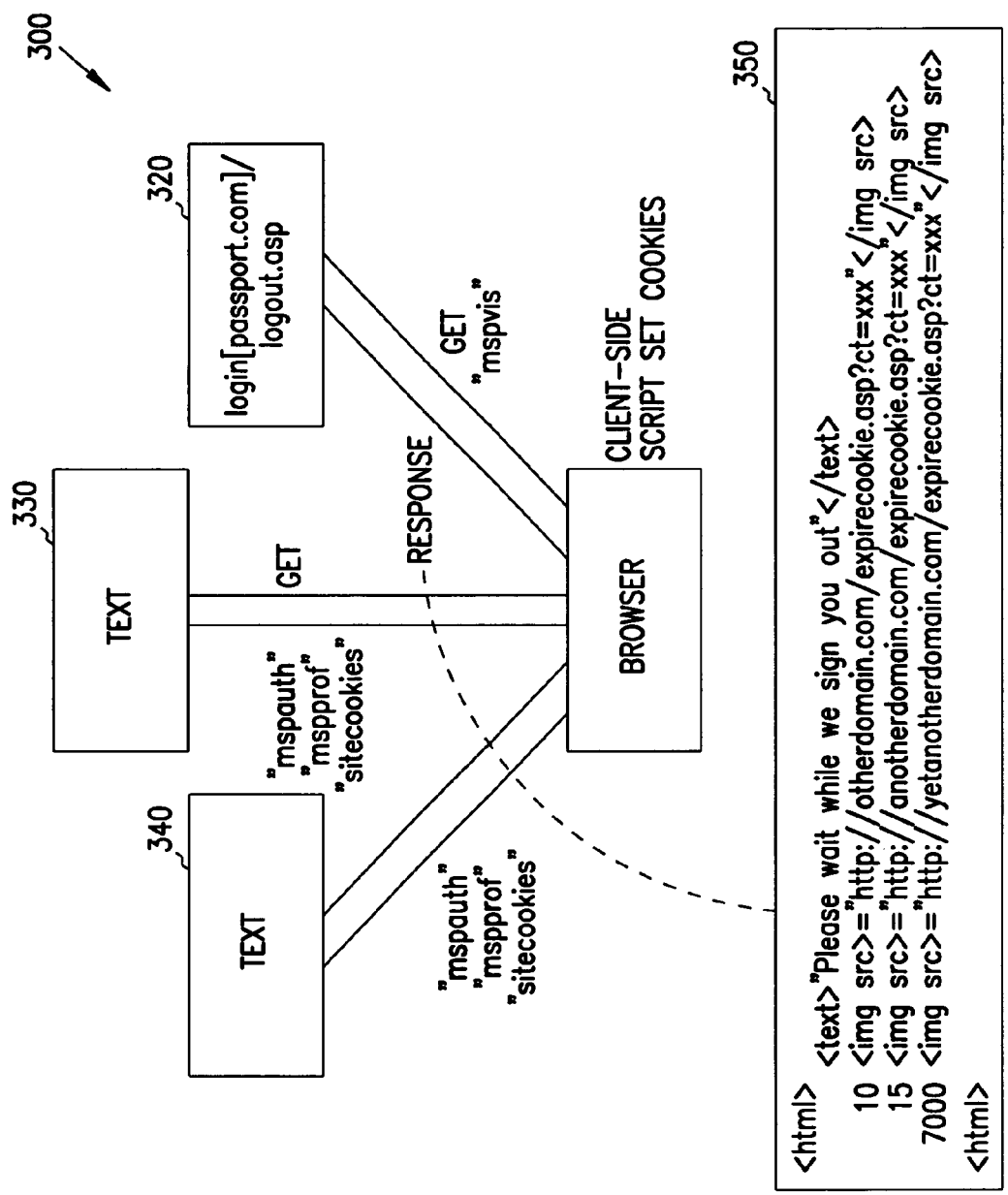
FIG. 3 is a block diagram showing a browser, logout server, and two affiliate sites to which a user is logged into.

In FIG. 3, an improved way of logging a user out of each affiliate server indicated in the visited sites cookie is shown in block diagram. A browser is shown at 310 in communication with a login server 320. The browser 310 is also shown as communicating with two affiliated servers 330 and 340. The affiliated servers for purposes of this description each reside on a different domain. It should be recognized that a domain may have more than one server, and that logging into one server may log a user into multiple servers on the same domain.

When a user desires to log out, the user can go to any site that contains a logout link pointing to a logout page on the login server 320. This results in the browser issuing a get visited sites cookie to the login server 320. The logout service on the authentication server builds an image source tag corresponding to each site identified in the visited sites cookie by providing markup language based source to the browser as indicted at 350. Each image source tag has a site ID. Three site IDs are shown at 350, "10, 15 and 7000". The visited sites cookie may simply be the list of site IDs in text string such as: "10, 15, 7000".

The image source tags are rendered into a page on the browser 310 that identifies the sites in the visited sites cookie, and also provides a position for a check mark or "x" mark to indicate whether or not logout was successful for each visited site. Text is provided at the top of the page in this example: "Please wait while we sign you out". A more elaborate page may easily be created if desired. Further, text may be provided instructing the user to wait for all check marks to render, and try again later or go to individual sites directly to ensure proper logout.

Each image source tag has a query string parameter on the end of it to cause the browser go and fetch the image via a separate transaction as opposed to referring to a cache of the image. The image source tag points to an expire cookies uniform resource locator (URL) that is hosted by each affiliated server. It responds with a set cookie header that clears desired cookies from the browser. One manner of clearing such cookies is to set their value to nothing, and set their expire time to a past date. The particular cookies cleared include profiles and authorizations, as well as site cookies that were generated by the visited affiliated servers. The cookies are labeled MSPAuth (authorization), MSPProf (profile), and site cookies in FIG. 3. Affiliated servers also respond with a small checkmark image which is added to the logout page on the browser to indicate successful logout. In one embodiment, code is used to look for a response from each affiliated server, and if not received in a desired period of time, it places an "x" or other symbol indicative of logout failure. Finally, the affiliated server from which logout was selected may be allowed to specify the page to be displayed to the user.

One aspect of the invention involves tricking the browser to think it is fetching image source from the domains. The browser is simply issuing separate requests for images to each visited affiliated server. The affiliated servers believe that they are returning just an image, but also send the set cookie header along with the checkmark which causes the browser to delete the desired cookies.

Figure 4:
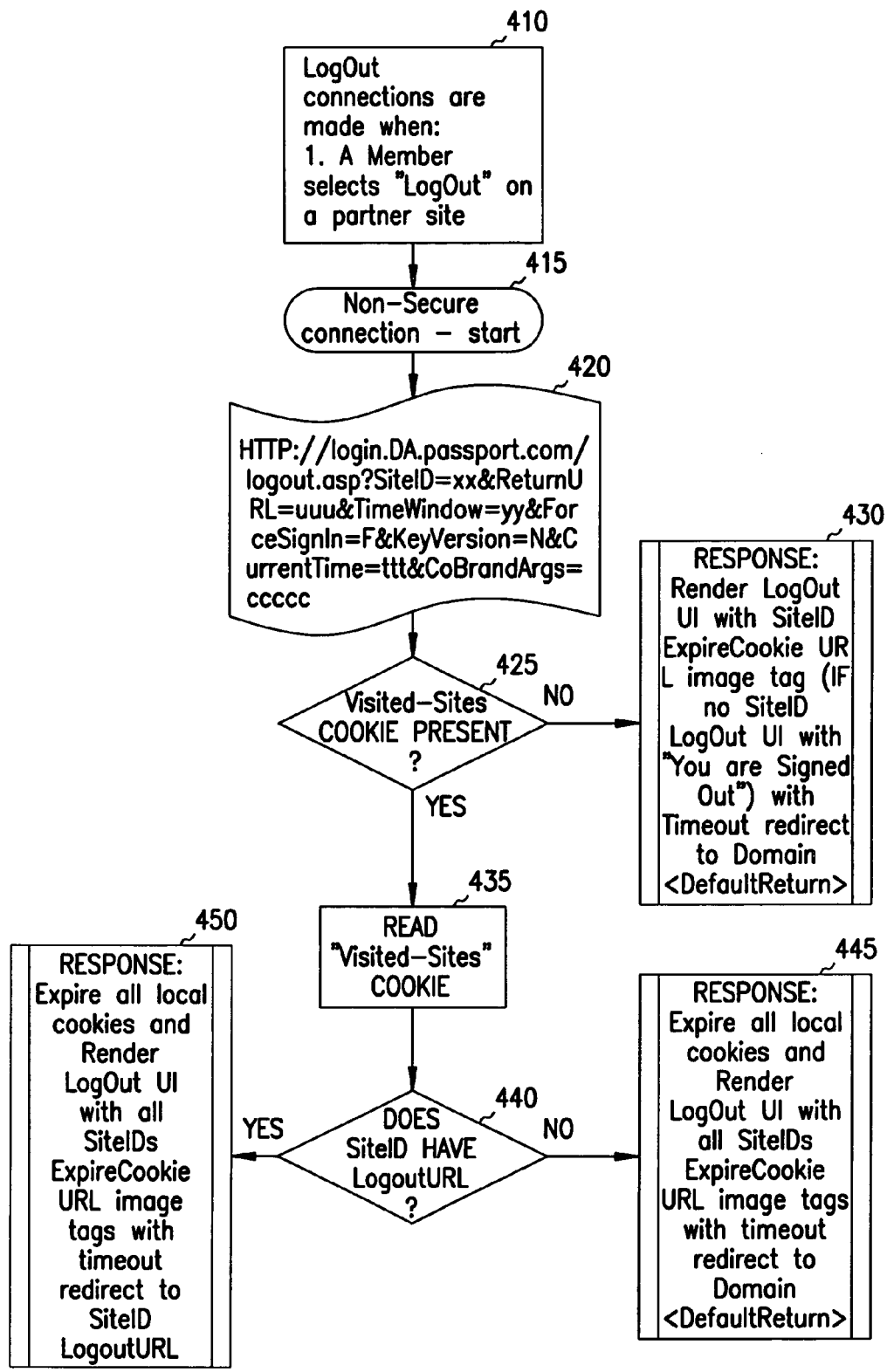
FIG. 4 is a flowchart indicating the logical flow of the logout server.

FIG. 4 is a flowchart of the logical flow of the logout process. At 410, the user selects logout on any affiliate server, or the authentication server. A non-secure connection is started at 415, and an incoming request to logout is received by the login server at 420. The request indicates the site ID which was assigned during registration, and may contain many of the same arguments used to log in, such as time windows and current time as well as other information if desired. It also may identify a return URL to indicate a page to direct the browser to when done logging out. At 425, a check is made to determine if the visited sites cookie is present. If not, an error case occurs and is handled at 430. If a site ID is provided, a logout user interface is rendered with a site ID expire cookie URL image tag that was specified by the site during registration. If no site ID is provided, a logout user interface indicating that "You are Signed Out" is provided. The user browser is then redirected to the domain on which logout was selected.

If at 425, a visited sites cookie is found, it is read at 435. At 440, a check is made to determine if the site ID has specified a logout URL during registration. If not, all local cookies are expired and a logout user interface is rendered with all siteIDs expire cookie URL image tags with a timeout upon which the browser is redirected to the domain's return URL.

If at 440, a siteID has a logout URL, all local cookies are expired and a logout user interface is rendered with all siteIDs expire cookie URL image tags with a timeout upon which the browser is redirected to the siteID logout URL.

The invention provides a simple mechanism to facilitate a user signing out of multiple sites without requiring special client downloads, server to server communication or special user interaction. The invention makes it easier to securely visit password protected sites while traveling and using kiosks, or generally using any browser that multiple people may access. It may be used simply for convenience, but also may be used to minimize the risk of compromising the users passwords or inadvertently providing personal or sensitive information to others.

We claim:

1. A method of logging a user of a computer system out of affiliated servers, the method comprising:
   providing a first cookie to a browser on the computer system being used by the user, the first cookie maintaining a list of affiliated servers having sites visited by the user following an authentication of the user;
   receiving one or more second cookies at the browser as the user visits sites on the affiliated servers following the authentication, the second cookies containing data associated with the corresponding affiliated servers;
   selecting a single logout link via the browser, wherein the logout link is contained on any of the sites that the user has visited on the affiliated servers;
   as a result of the selecting, issuing by the browser a request for obtaining data from the affiliated servers based on the list maintained with the first cookie;
   in response to the request for data issued by the browser, sending, by the affiliated servers, to the browser, cookie setting information and an image which is indicative of successful logout;
   in response to receiving the cookie setting information by the browser, clearing the second cookies from the browser by changing settings of the second cookies in accordance with the cookie setting information, wherein the user is logged out of the affiliated servers having sites visited by the user following the authentication by selection of the single logout link.

2. The method of claim 1 wherein the second cookies are expired by the browser in response to the cookie setting information to log the user out of the affiliated servers having the sites that the user visited.

3. The method of claim 1, wherein the request for data from the affiliated servers is issued by the browser during rendering of a logout page on the browser, wherein the logout page is received by the browser as a result of selecting the logout link.

4. The method according to claim 1, further including steps of:

hosting by each affiliated server a URL used for retiring cookies during logging out of the user;

directing the request for data issued by the browser to the URL for retiring cookies for each affiliated server having a site that the user has visited following the authentication; and sending, by the affiliated servers receiving the request, the image and a set cookie header including the cookie setting information for changing the settings of the second cookies for clearing the second cookies.

5. A computer readable storage medium having a program stored thereon for causing a computer to implement a method of logging a user of a computer system out of affiliated servers, the method comprising:

providing a first cookie to a browser on the computer system being used by the user, the first cookie for maintaining a list of affiliated servers having sites visited by the user following an authentication of the user;

receiving one or more second cookies at the browser as the user visits sites on the affiliated servers following the authentication, the second cookies containing data associated with the corresponding affiliated servers;

selecting a single logout link via the browser, wherein the logout link is contained on any of the sites that the user has visited on the affiliated servers;

as a result of the selecting, issuing by the browser a request for obtaining data from the affiliated servers based on the list maintained with the first cookie;

in response to the request for data issued by the browser, sending, by the affiliated servers, cookie setting information and an image to the browser which is indicative of a successful logout;

in response to receiving the cookie setting information by the browser, clearing the second cookies from the browser by changing settings of the second cookies based on the cookie setting information.

6. The computer readable storage medium of claim 2 wherein the request for data from the affiliated servers is issued by the browser during rendering of a logout page on the browser.

7. The computer readable storage medium of claim 2 wherein the user is logged out of the affiliated servers having sites visited by the user by selection of the single logout link.

8. The computer-readable medium of claim 5, wherein the data contains at least one of:

a date and time that the user is authenticated by an authentication server, and a profile for the user.

9. A method of logging a user of a computer system out of affiliated servers comprising:

receiving one or more cookies at a browser on the computer system as the user visits sites on the affiliated servers following an authentication of the user, wherein the one or more cookies contain data provided to the browser from corresponding one or more affiliated servers;

requesting a logout page via the browser, wherein a logout link to the logout page is contained on at least one site that the user has visited on an affiliated server following the authentication of the user;

providing a link to an expire cookies page hosted on each affiliated server having a site visited by the user following the authentication;

calling by the browsers, during rendering of the logout page by the browser, the link to the expire cookies page on each affiliated server;

sending cookie setting information from each affiliated server to the browser in response to receiving the call from the browser, the cookie setting information changing settings of the cookies to cause the browser to expire the cookies.

10. The method of claim 9, wherein the data contains at least one of:

a date and time that the user is authenticated by an authentication server, a profile for the user, and a list of sites visited by the user following the authentication, wherein the sites include web servers.

11. A system for logging a user of a computer system out of affiliated servers comprising:

one or more processors;

one or more computer readable storage media coupled to the one or more processors, wherein the one or more processors are configured to execute modules including:

a first module providing a browser on the computer system that receives one or more cookies as the user visits sites on the affiliated servers following an authentication of the user, wherein the one or more cookies contain data provided to the browser from corresponding one or more affiliated servers, wherein the browser issues a request for a logout page, wherein a logout link to the logout page is contained on at least one site on the affiliated servers that the user has visited following an authentication of the user by an authentication server; and a second module that provides a link to an expire cookies page on each affiliated server that, when called by the browser, causes each affiliated server to clear cookies on the browser by sending cookie setting information to the browser, the cookie setting information changing settings of the cookies to cause the browser to expire the cookies, wherein the cookies include data provided to the browser from an associated one of the affiliated servers, and wherein the data contains at least one of:

a date and time that the user is authenticated by an authentication server, and a profile for the user.

12. The system of claim 11 further comprising a visited sites cookie for maintaining a list of affiliated servers that the user has visited following the authentication.

13. The system of claim 12 wherein the list of affiliated servers is used to identify the link to each expire cookies page on each affiliated server.

14. The system of claim 11 wherein the request for a logout page causes the logout page to be rendered by the browser, the logout page directing the browser to link to the expire cookies page on each affiliated server.

15. A computer readable storage medium having a program stored thereon for causing a computer to implement a method of logging a user of a computer system out of affiliated servers, comprising:

receiving a request for a logout page via a browser on the computer system, wherein a logout link to the logout page is contained on at least one site on the affiliated servers that the user has visited following an authentication of the user, wherein following the authentication, cookies are provided to the browser as the user visits sites on the affiliated servers, wherein the cookies contain data provided to the browser from corresponding affiliated servers;

providing a link to an expire cookies page on each affiliated server having a site visited by the user that when called by the browser as a result of requesting the logout page, causes each affiliated server to clear cookies on the browser by sending cookie setting information to the browser, the cookie setting information changing settings of the cookies to cause the browser to expire the cookies.

16. The computer-readable medium of claim 15, wherein the data contains at least one of:
   a date and time that the user is authenticated by an authentication server,
   a profile for the user, and
   a list of sites visited by the user following the authentication, wherein the sites include web servers.

17. A method of logging out of affiliated domain servers on a network, the method performed by a browser implemented on a computer, the method comprising:
   receiving one or more cookies at the browser as a user visits sites on the affiliated servers following an authentication of the user by an authentication server, wherein the one or more cookies contain data provided to the browser from the authentication server;
   requesting a logout page from the authentication server by selecting a logout link, wherein the logout link is on at least one site on the affiliated domain servers that a user of the browser has visited following the authentication;
   receiving image tags from the authentication server with the logout page, each image tag causing the browser to fetch an image from a URL identified by the image tag during rendering of the logout page;
   in response to the image tags, issuing get image requests to the URLs identified by the image tags;
   receiving cookie setting information and images at the browser from the affiliated domain servers hosting the URLs identified by the image tags in response to the get image requests, the cookie setting information clearing cookies identified by responses to the get image requests, wherein the clearing is carried out by changing settings of the cookies in accordance with the cookie setting information; and
   rendering the images received with the cookie setting information in the responses from the affiliated domain servers for inclusion in the logout page displayed by the browser.

18. The method of claim 17 wherein the images comprise an image of a checkmark for indicating successful logout from a corresponding one of the affiliated servers.

19. The method of claim 17 wherein the image tags ensure that the image will not be retrieved from cache.

20. The method of claim 17 wherein the image tag includes a query.

21. The method of claim 17 wherein the affiliated domain servers logged into are identified in a visited sites data structure.

22. The method of claim 21 wherein the data structure comprises a visited sites cookie provided to the browser by the authentication server.

23. The method of claim 17, wherein the data contains at least one of:
   a date and time that the user is authenticated by an authentication server,
   a profile for the user, and
   a list of sites visited by the user following the authentication, wherein the sites include web servers.

24. A method of logging a user of a computer system out of affiliated servers comprising:
   receiving one or more cookies at a browser on the computer system as the user visits sites on the affiliated servers following an authentication of the user, the cookies containing data provided to the browser from an authentication server;
   requesting a logout page, wherein a logout link for the logout page is on at least one site on the affiliated servers that the user has visited following an authentication of the user;
   providing a link to an expire cookies page hosted on each affiliated server, said link being in the form of an image tag included in the logout page;
   calling each link by the browser in response to encountering the image tags in the logout page;
   in response to the calling of each link, sending cookie setting information with an image sent to the browser by each affiliated server having a site that the user has visited following the authentication to clear cookies on the browser, the cookie setting information changing settings of the cookies to cause the browser to expire the cookies.

25. The method of claim 24 wherein a data structure of visited sites is maintained identifying the affiliated servers that are visited by the user following the authentication.

26. The method of claim 25 wherein the data structure is a visited sites cookie provided to the browser by the authentication server.

27. The method of claim 24 wherein the logout link is provided on one or more of multiple servers logged into through the affiliated servers, one of the affiliated servers, and the authentication server.

28. The method of claim 24 wherein the cookies comprise user personal information.

29. The method of claim 24, wherein the data contains at least one of:
   a date and time that the user is authenticated by an authentication server,
   a profile for the user, and
   a list of sites visited by the user following the authentication, wherein the sites include web servers.

30. A method of generating a logout page for display on a browser used to log a user of a computer system out of affiliated servers, the method comprising:
   obtaining a visited sites data file which identifies each affiliated server logged into having a site visited following an authentication of the user;
   generating a plurality of image tags based on the visited sites data file, each image tag corresponding to one of the affiliated servers;
   providing a URL in each image tag that causes an affiliated server associated with the image tag to clear cookies from the browser by sending cookie setting information for changing settings of the cookies to cause the cookies to be deleted by the browser, the cookie setting information being sent to the browser with an image sent to the browser by the corresponding affiliated server in response to receipt of an image fetch request sent by the browser when the browser encounters the image tag,
   wherein the cookies deleted include data provided to the browser from an associated one of the affiliated servers, and
   generating the logout page by the browser by including the images received by the browser from the affiliated servers in the logout page.

31. The method of claim 30 wherein each image tag contains a query string parameter causing the browser to fetch an image from the affiliated server corresponding to the image tag as a separate image fetching transaction.

32. A method of logging a computer system user out of affiliated servers comprising steps of:

authenticating a user to visit sites on the affiliated servers by an authentication server associated with the affiliated servers;

providing a first cookie to a browser being used by the user, the first cookie for maintaining a list of affiliated servers having sites visited by the user following the authentication of the user, wherein as the user visits sites on the affiliated servers following the authentication, second cookies containing data associated with the corresponding affiliated servers are stored by the browser;

selecting, by the user via the browser, a single logout link, wherein the logout link is contained on any site that the user has visited on the affiliated servers or the authentication server following the authentication;

receiving the selection of the logout link at the authentication server;

generating a plurality of image tags based on the first cookie maintaining the list of sites visited following the authentication, each image tag corresponding to one of the affiliated servers;

providing the image tags in a logout page to be rendered by the browser;

rendering the logout page on the browser of the user;

in response to encountering the image tags in the logout page by the browser, generating a plurality of image requests by the browser during rendering of the logout page based on the list of affiliated servers maintained by the first cookie, each image request corresponding to one of the affiliated servers listed in the list of affiliated servers;

sending the image requests by the browser to URLs hosted by the corresponding affiliated servers, wherein each URL is for an expire cookies page on each affiliated server that, when called by the browser, causes each affiliated server to clear cookies on the browser by sending cookie setting information and an image to the browser;

in response to sending the image requests, receiving at the browser from each affiliated server receiving the image request, an image identified by the image request and cookie setting information;

changing settings of the second cookies in response to the cookie setting information to cause the second cookies to be expired by the browser, wherein expiration of the second cookies causes the user to be logged out of the affiliated servers having sites visited by the user following the authentication;

completing rendering of the logout page by the browser by incorporating the images received from the affiliated servers in the rendered logout page.

\* \* \* \* \*

UNITED STATES PATENT AND TRADEMARK OFFICE
CERTIFICATE OF CORRECTION

| | |
|---|---|
| PATENT NO. | : 7,673,045 B1 |
| APPLICATION NO. | : 09/594332 |
| DATED | : March 2, 2010 |
| INVENTOR(S) | : Ryan W. Battle et al. |

It is certified that error appears in the above-identified patent and that said Letters Patent is hereby corrected as shown below:

In column 9, line 37, in Claim 6, delete "2" and insert -- 5 --, therefor.

In column 9, line 41, in Claim 7, delete "2" and insert -- 5 --, therefor.

In column 9, line 63, in Claim 9, delete "browsers" and insert -- browser --, therefor.

Signed and Sealed this
Twenty-fourth Day of July, 2012

David J. Kappos
*Director of the United States Patent and Trademark Office*